US010404418B2

(12) United States Patent
Wu

(10) Patent No.: US 10,404,418 B2
(45) Date of Patent: Sep. 3, 2019

(54) DEVICE AND METHOD OF HANDLING UPLINK TRANSMISSION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 219 days.

(21) Appl. No.: 15/635,226

(22) Filed: Jun. 28, 2017

(65) Prior Publication Data

US 2017/0373803 A1 Dec. 28, 2017

Related U.S. Application Data

(60) Provisional application No. 62/355,351, filed on Jun. 28, 2016.

(51) Int. Cl.

*H04L 1/18* (2006.01)
*H04W 72/04* (2009.01)
*H04W 72/14* (2009.01)

(52) U.S. Cl.

CPC .......... *H04L 1/1861* (2013.01); *H04L 1/1887* (2013.01); *H04W 72/04* (2013.01); *H04W 72/042* (2013.01); *H04W 72/14* (2013.01)

(58) Field of Classification Search

None
See application file for complete search history.

(56) References Cited

U.S. PATENT DOCUMENTS

2011/0205928 A1 8/2011 Pelletier
2012/0257559 A1 10/2012 Kim
2013/0114573 A1 5/2013 Suzuki
2015/0092645 A1 4/2015 Tabet
2015/0188670 A1 7/2015 Lee
2015/0382372 A1* 12/2015 Vajapeyam .......... H04W 24/10 370/329

(Continued)

FOREIGN PATENT DOCUMENTS

CN 102420683 A 4/2012
CN 104283659 A 1/2015

OTHER PUBLICATIONS

Notice of Allowance dated Jan. 19, 2018 for the Taiwan application No. 106121674, filing date Jun. 28, 2017, p. 1-4.

(Continued)

*Primary Examiner* — Alex Skripnikov
(74) *Attorney, Agent, or Firm* — Winston Hsu

(57) ABSTRACT

A communication device comprises a storage device for storing instructions of receiving a semi-persistent scheduling (SPS) uplink (UL) grant in a transmission time interval (TTI) from a base station (BS), wherein the SPS UL grant indicates a UL frequency resource periodically allocated to the communication device; storing the SPS UL grant as a configured UL grant; initializing the configured UL grant to start in an earliest TTI after the first TTI and applying the configured UL grant to a plurality of TTIs after the earliest TTI; transmitting at least one first repetition of a UL transmission by using a hybrid automatic repeat request (HARQ) process according to the configured UL grant; starting a UL HARQ round trip time (RTT) timer for the HARQ process in response to the UL transmission; and starting a drx-ULRetransmissionTimer for the HARQ process, when the UL HARQ RTT timer expires.

4 Claims, 6 Drawing Sheets

(56) References Cited

U.S. PATENT DOCUMENTS

2016/0044641 A1 2/2016 Bai
2016/0302224 A1* 10/2016 Khairmode .......... H04L 5/0055

OTHER PUBLICATIONS

Huawei, Hisilicon, Correction on HARQ process selection for UL asynchronous HARQ, 3GPP TSG-RAN WG2 Meeting #94, R2-163959, May 23-27, 2016, Nanjing, China.
Interdigital Communications, Update to DRX Behaviour in support of Asynchronous UL HARQ, 3GPP TSG-RAN WG2 #91bis, Tdoc R2-154650, Oct 5-9, 2015, Malmö, Sweden.
Office Action dated Aug. 28, 2018 for the Japanese Application No. 2017-126394, filing date Jun. 28 2017, pp. 1-3.
Search Report dated Dec. 12, 2017 for EP application No. 17178491.1, pp. 1-23.
Samsung, "Open UP Issues in Rel-13 eMTC", 3GPP TSG-RAN WG2 Meeting #93, R2-161270, Feb. 15-19, 2016, St. Julian's, Malta, XP051065473, pp. 1-3.
LG Electronics Inc., Nokia, NEC, "Reconsideration on drx-InactivityTimer for NB-IoT", 3GPP TSG-RAN WG2 Meeting #94, R2-164202, May 23-27, 2016, Nanjing, China, XP051105485, pp. 1-6.
Search Report dated Apr. 16, 2018 for EP application No. 17178491.1, pp. 1-7.
Ericsson, "MAC impacts of asynchronous HARQ for BL UEs and UEs in EC", 3GPP TSG-RAN WG2 #93, Tdoc R2-161689, Feb. 15-19, 2016, St. Julian's, Malta, XP051065925, pp. 1-11.
Office action dated Mar. 19, 2019 for EP application No. 17178491.1, pp. 1-6.
LG Electronics Inc., Nokia, NEC, "Reconsideration on drx-InactivityTimer for NB-IoT", 3GPP TSG-RAN WG2 Meeting #94, R2-164202, May 23-27, 2016, Nanjing, China, pp. 1-6.
Search Report dated Jan. 8, 2019 for EP application No. 18195319.1, pp. 1-4.
CATT, "DRX and Short Interval SPS", 3GPP TSG RAN WG2 Meeting #92, R2-156257, Nov. 16-20, 2015, Anaheim, USA, XP051005753, pp. 1-4.
Ericsson, "MAC impacts of asynchronous HARQ for BL UEs and UEs in EC", 3GPP TSG-RAN WG2 #93, Tdoc R2-161689, Feb. 15-19, 2016, St. Julian's, Malta, XP051065925, pp. 1-10.
Notice of Allowance dated Feb. 12 2019 for the Japan Application No. 2017-126394, filing date Jun. 28, 2017, pp. 1-4.
Huawei, HiSilicon, UL HARQ handling for LAA SCell, 3GPP TSG-RAN WG2 Meeting #93bis, R2-162430, Apr. 11-15, 2016, Dubrovnik, Croatia.
Huawei, HiSilicon, Discussion on synchronous and asynchronous HARQ method for eLAA, 3GPP TSG RAN WG1 Meeting #85, R1-164106, May 23-May 27, 2016, Nanjing, China.
HTC, Discussion on asynchronous uplink HARQ operations, 3GPP TSG-RAN WG2#90, R2-152417, May 25-29, 2015, Fukouka, Japan, pp. 1-2.
Ericsson, Connected Mode DRX for NB-IoT, 3GPP TSG-RAN WG2 Meeting Nb-IOT ad-hoc, R2-160471, Jan 19-21, 2016, Budapest, Hungary, pp. 1-7.

* cited by examiner

DEVICE AND METHOD OF HANDLING UPLINK TRANSMISSION

CROSS REFERENCE TO RELATED APPLICATIONS

This application claims the benefit of U.S. Provisional Application No. 62/355,351 filed on Jun. 28, 2016, which is incorporated herein by reference.

BACKGROUND OF THE INVENTION

1. Field of the Invention

The present invention relates to a device and a method used in a wireless communication system, and more particularly, to a device and a method of handling an uplink transmission.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network. The core network may include mobility management and Quality of Service (QoS) control for the UE.

SUMMARY OF THE INVENTION

The present invention therefore provides a communication device and method for handling an uplink transmission to solve the abovementioned problem.

A communication device for handling an uplink (UL) transmission, comprises a storage device for storing instructions and a processing circuit coupled to the storage device. The processing circuit is configured to execute the instructions stored in the storage device. The instructions comprise receiving a semi-persistent scheduling (SPS) UL grant on a control channel in a first transmission time interval (TTI) from a base station (BS), wherein the SPS UL grant indicates a UL frequency resource periodically allocated to the communication device for a plurality of UL transmissions; storing the SPS UL grant as a configured UL grant; initializing the configured UL grant to start in an earliest TTI after the first TTI and applying the configured UL grant to a plurality of TTIs after the earliest TTI; transmitting at least one first repetition of a UL transmission by using a hybrid automatic repeat request (HARQ) process according to the configured UL grant; starting a UL HARQ round trip time (RTT) timer for the HARQ process in response to the UL transmission; and starting a drx-ULRetransmissionTimer for the HARQ process, when the UL HARQ RTT timer expires.

A network for handling an uplink (UL) transmission, comprises a storage device for storing instructions and a processing circuit coupled to the storage device. The processing circuit is configured to execute the instructions stored in the storage device. The instructions comprise configuring a discontinuous reception (DRX) operation to a communication device; transmitting a semi-persistent scheduling (SPS) UL grant on a control channel to the communication device, wherein the SPS UL grant indicates a UL frequency resource periodically allocated to the communication device for a plurality of UL transmissions; receiving at least one first repetition of a UL transmission from the communication device, wherein the at least one first repetition is transmitted by the communication device using a HARQ process according to the SPS UL grant and a UL HARQ RTT timer is started by the communication device for the HARQ process in response to the UL transmission; and transmitting a dynamic scheduling UL grant to the communication device, when the UL HARQ RTT timer expires and the UL transmission is not successfully received, wherein the dynamic scheduling UL grant indicates the communication device to retransmit the first UL transmission.

A communication device for handling an uplink (UL) transmission, comprises a storage device for storing instructions and a processing circuit coupled to the storage device. The processing circuit is configured to execute the instructions stored in the storage device. The instructions comprise performing a discontinuous reception (DRX) operation configured by a base station (BS); transmitting a random access preamble to the BS; receiving a random access response (RAR) comprising a UL grant from the BS in response to the random access preamble, wherein the UL grant indicates a UL frequency resource for a UL transmission; transmitting at least one repetition of the UL transmission by using a hybrid automatic repeat request (HARQ) process according to the UL grant; starting a UL HARQ round trip time (RTT) timer for the HARQ process in response to the UL transmission; and starting a drx-ULRetransmissionTimer for the HARQ process, when the UL HARQ RTT timer expires.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
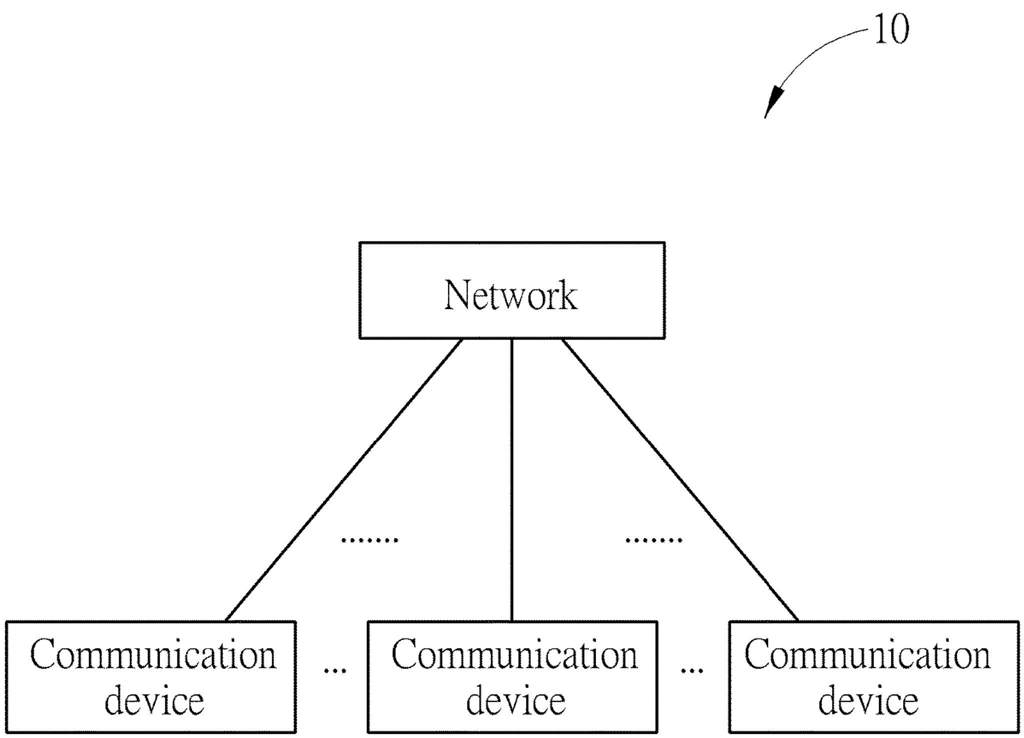
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device communicate with each other via one or more cells on one or more carriers of licensed band(s) and/or unlicensed band(s). The one or more cells may be operated in the same or different frame structure types, or in the same or different duplexing modes, i.e. frequency-division duplexing (FDD) and time-division duplexing (TDD).

In FIG. 1, the network and the communication devices are simply utilized for illustrating the structure of the wireless communication system 10. The network may include a radio access network (RAN) including at least one base station (BS). Practically, the RAN may be an evolved universal terrestrial radio access network (E-UTRAN) including at least one evolved Node-B (eNB). The RAN may be a fifth generation (5G) network including at least one 5G BS (e.g., gNB) which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the eNB and the 5G BS. Furthermore, the network may also include a core network which includes network entities connecting to the RAN.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
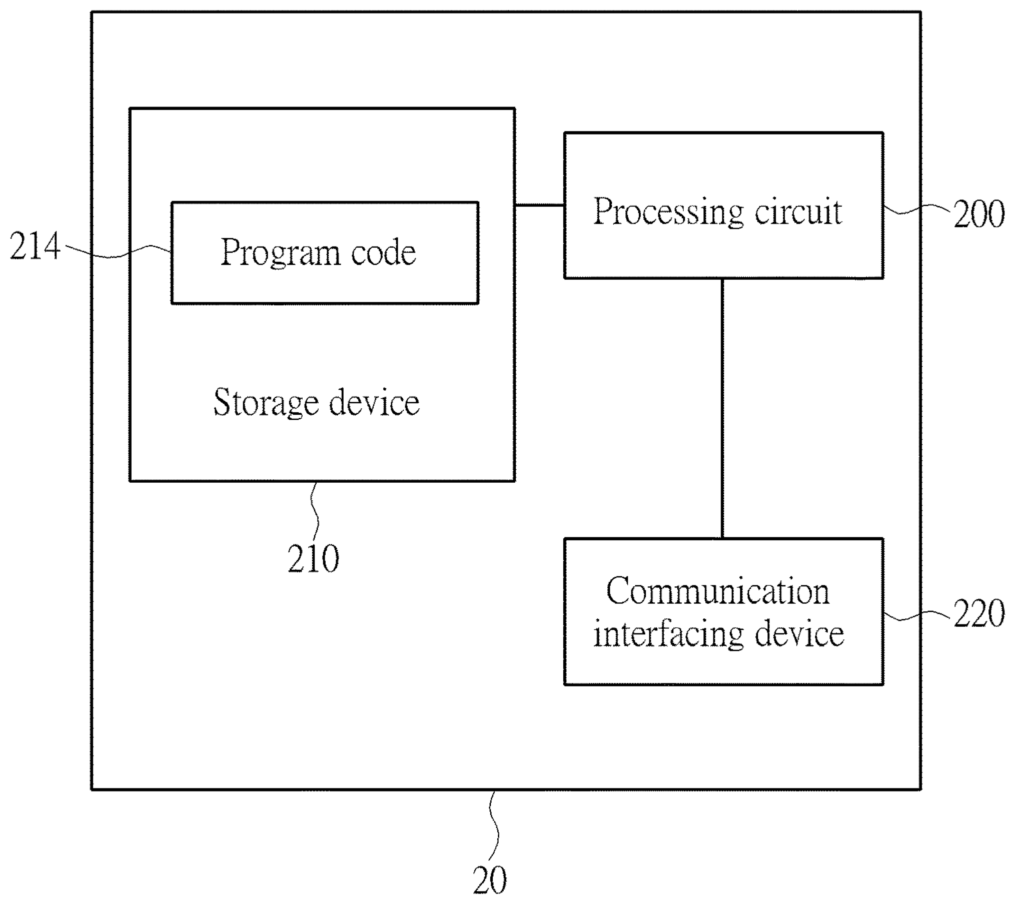
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
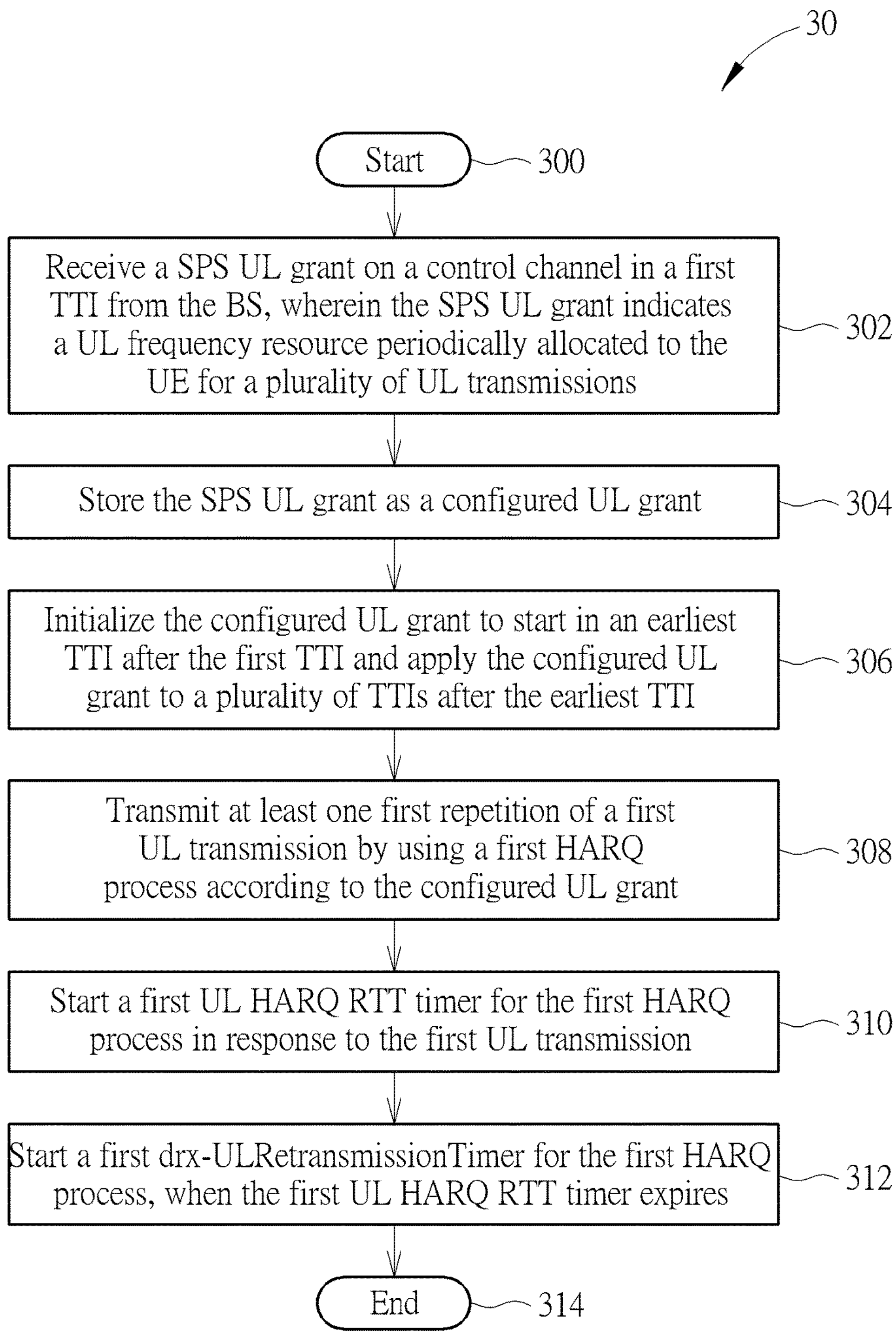
FIG. 3 is a flowchart of a process according to an example of the present invention.

FIG. 3 is a flowchart of a process 30 according to an example of the present invention. The process 30 is utilized in a UE (e.g., a communication device in FIG. 1), to handle a UL transmission (e.g., asynchronous transmission). The process 30 includes the following steps:

Step 300: Start.

Step 302: Receive a semi-persistent scheduling (SPS) UL grant on a control channel in a first TTI from the BS, wherein the SPS UL grant indicates a UL frequency resource periodically allocated to the UE for a plurality of UL transmissions.

Step 304: Store the SPS UL grant as a configured UL grant.

Step 306: Initialize the configured UL grant to start in an earliest TTI after the first TTI and apply the configured UL grant to a plurality of TTIs after the earliest TTI.

Step 308: Transmit at least one first repetition of a first UL transmission by using a first hybrid automatic repeat request (HARQ) process according to the configured UL grant.

Step 310: Start a first UL HARQ RTT timer for the first HARQ process in response to the first UL transmission.

Step 312: Start a first drx-ULRetransmissionTimer for the first HARQ process, when the first UL HARQ RTT timer expires.

Step 314: End.

According to the process 30, the UE starts a first UL HARQ RTT timer for the first HARQ process in response to the first UL transmission, when the UE has the configured UL grant for the first HARQ process. The SPS UL grant may include a HARQ process number indicating a HARQ process identifier of the first HARQ process. When the network does not successfully receive the first UL transmission, the network takes the first UL HARQ RTT timer into account to schedule a UL retransmission of the first UL transmission. That is, the network does not transmit a dynamic scheduling UL grant indicating the UL retransmission to the UE, before the first UL HARQ RTT timer expires. In one example, the control channel is a physical DL control channel (PDCCH), an enhanced PDCCH (EPDCCH), a machine-type communications (MTC) PDCCH (MPDCCH), a short PDCCH (sPDCCH) or a narrowband PDCCH (NPDCCH). In one example, the control channel is a dedicated control channel (DCCH). The network may transmit the SPS UL grant in a first DL control information (DCI) or in a Radio Resource Control (RRC) message. In one example, the network transmits the dynamic scheduling UL grant to the UE in a second DCI in a second TTI on the control channel.

The UE may transmit a repetition of the first UL transmission in a TTI of the plurality of TTIs. The UE may start the first UL HARQ RTT timer for the first HARQ process according to the TTI (i.e., the timing of the first UL transmission). For example, the UE starts the first UL HARQ RTT timer in the TTI. In one example, the repetition may be the last repetition.

As stated in the process 30, the UE starts the first drx-ULRetransmissionTimer, when the first UL HARQ RTT timer expires. Thus, the UE may monitor the control channel (e.g., PDCCH, EPDCCH, MPDCCH or NPDCCH), when the first drx-ULRetransmissionTimer is running in TTI(s) belonging to an off duration of a discontinuous reception (DRX) cycle configured by the network to the UE. The UE performs a DRX operation according to the DRX cycle. When the network needs (or intends) to transmit a control command to the UE in the off duration of the DRX cycle, the network can transmit a UL grant to the UE in one of the TTI(s) since the first drx-ULRetransmissionTimer is running. In other words, the network also takes into account whether the first drx-ULRetransmissionTimer is running (especially in the off duration of the DRX cycle of the UE), when the network needs to transmit the control command. That is, the network may not transmit the control command in the TTI(s) of the DRX cycle of the UE, when the first drx-ULRetransmissionTimer is not running.

In one example, the network maintains a timer corresponding to the first drx-ULRetransmissionTimer running in the UE. The network determines that the first drx-ULRetransmissionTimer is running, when the timer is running. The network determines that the first drx-ULRetransmissionTimer is not running, when the timer is not running (e.g., expires). In another example, the network determines the first drx-ULRetransmissionTimer is running, when a TTI is within a first length of the first drx-ULRetransmissionTimer which starts according to a second length of the first UL HARQ RTT timer. The network determines that the first drx-ULRetransmissionTimer is not running, when a TTI is outside the first length. The second length may be configured by the network or may be predetermined by the UE.

In one example, the first repetition of the at least one first repetition is a new transmission, and rest of the at least one first repetition after the first repetition is retransmission(s). The UE transmit the new transmission in a TTI. The UE transmits the rest of the at least one first repetition in TTI(s) following the TTI. In one example, the at least one first repetition includes a first plurality of repetitions, if the UE is a narrowband Internet of Things (IoT) (NB-IoT) UE, is a bandwidth-reduced low-complexity (BL) UE (BL UE), or is in coverage enhancement (CE). The repetition number of the first plurality of repetitions may be indicated in the SPS UL grant. In one example, the at least one first repetition includes only one repetition (i.e., the UE transmits the first UL transmission only once), if the UE is none of a NB-IoT UE, a BL UE, and in CE. In this example, the SPS UL grant may not indicate the repetition number, or may indicate only one repetition.

In one example, the UE starts the first UL HARQ RTT timer in response to the first UL transmission by starting the first UL HARQ RTT timer in response to one of the first plurality of repetitions. For example, the one of the first plurality of repetitions may be the first repetition, the second repetition, . . . , or the last repetition of the first plurality of repetitions.

In one example, the network transmits the control command on the control channel. The control command may be a dynamic scheduling UL grant, the SPS UL grant, a dynamic scheduling DL assignment, a SPS DL assignment, a UL power control command, a Channel State Information (CSI) request or a sounding reference symbols (SRS) request. The UE may transmit at least one second repetition of the retransmission by using the first HARQ process according to the dynamic scheduling UL grant, if the dynamic scheduling UL grant indicates a UL retransmission of the first UL transmission. The at least one second repetition may include only one repetition (i.e., the UE transmits the second UL transmission only once), if the UE is none of a NB-IoT UE, a BL UE, and in CE. The at least one second repetition may include a second plurality of repetitions, if the UE is a NB-IoT UE, a BL UE, or in CE. The number of the second plurality of repetitions may be indicated in the dynamic scheduling UL grant.

It should be noted that when the UE receives the SPS UL grant in the TTI, e.g., which is (n+k) time units before the earliest TTI, the UE transmits a third UL transmission according to the SPS UL grant in the earliest TTI. "k" may be a non-negative integer which is configured by the network or is predetermined by the UE. In one example, "k" may be 4 for a FDD mode, and may be 0, 1, 2, . . . for a TDD mode according to a TDD configuration. In one example, the time unit is a subframe or a time slot. In another example, the time unit is a time duration of 1, 2, 3 or 4 OFDM symbols. Depending on whether the UE is configured to use repetitions, the third UL transmission may include one or more repetitions.

Figure 4:
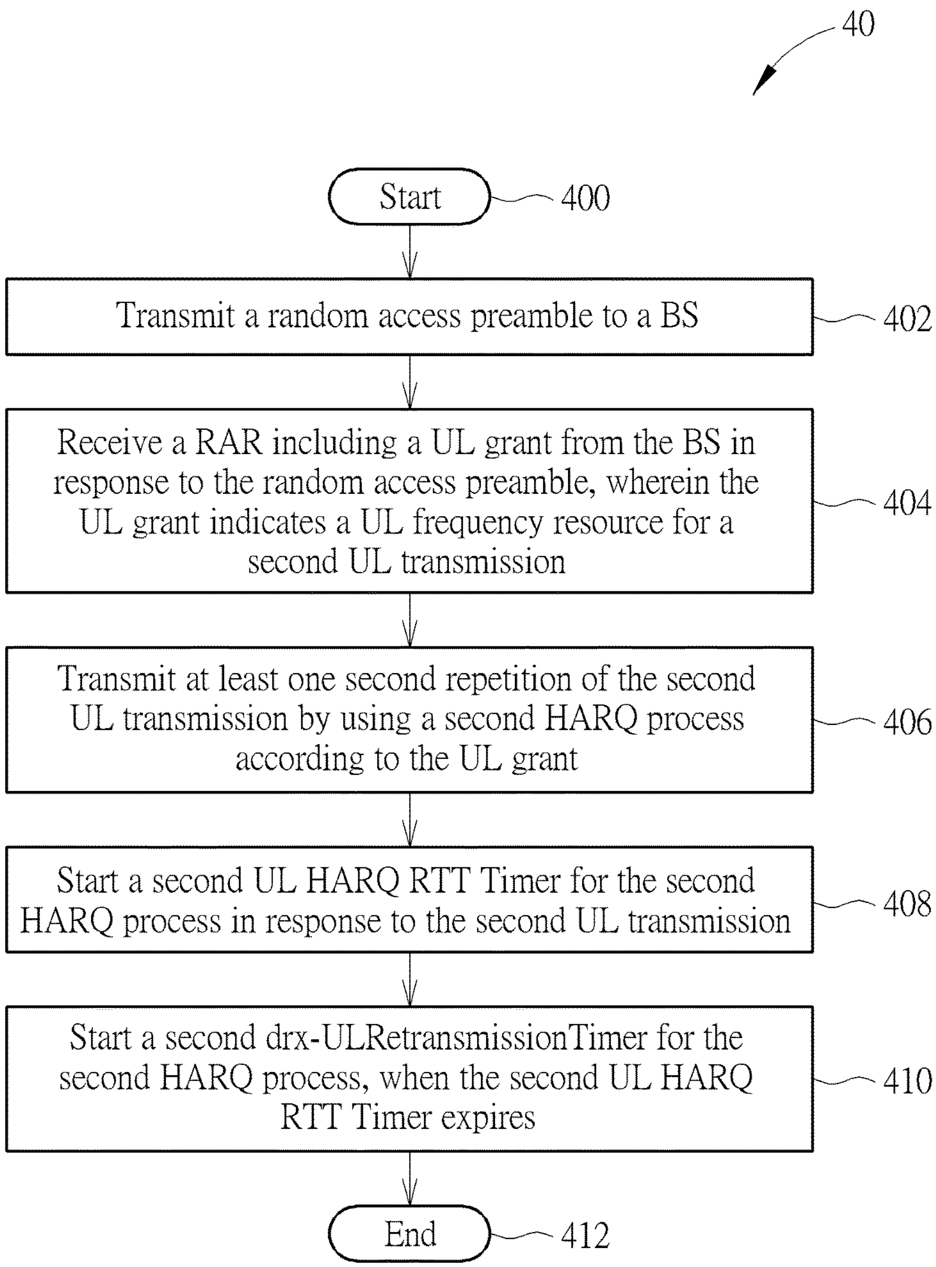
FIG. 4 is a flowchart of a process according to an example of the present invention.

FIG. 4 is a flowchart of a process 40 according to an example of the present invention. The process 40 is utilized in a UE (e.g., a communication device in FIG. 1), to handle a UL transmission (e.g., asynchronous transmission). The process 40 includes the following steps:

Step 400: Start.

Step 402: Transmit a random access preamble to a BS.

Step 404: Receive a random access response (RAR) including a UL grant from the BS in response to the random access preamble, wherein the UL grant indicates a UL frequency resource for a second UL transmission.

Step 406: Transmit at least one second repetition of the second UL transmission by using a second HARQ process according to the UL grant.

Step 408: Start a second UL HARQ RTT Timer for the second HARQ process in response to the second UL transmission.

Step 410: Start a second drx-ULRetransmissionTimer for the second HARQ process, when the second UL HARQ RTT Timer expires.

Step 412: End.

According to the process 40, the UE starts a second UL HARQ RTT timer for the second HARQ process in response to the second UL transmission configured by the RAR. In one example, the UE receives the RAR in a physical DL shared channel (PDSCH), a narrowband PDSCH (NPDSCH) or a short PDSCH (sPDSCH). That is, even if the UE does not receive a PDCCH in a TTI, which indicates the UE to transmit the second UL transmission, the UE starts the second UL HARQ RTT timer. When the network does not successfully receive the second UL transmission, the network takes the second UL HARQ RTT timer into account to schedule a UL retransmission of the second UL transmission. That is, the network does not transmit a dynamic scheduling UL grant indicating the UL retransmission to the UE before the second UL HARQ RTT timer expires. The RAR may include a timing adjustment value. The RAR may include a HARQ process number indicating a HARQ process identifier of the second HARQ process. The UE may recognize the second HARQ process according to the HARQ process number. If the RAR does not include the HARQ process number, the second HARQ process may be predetermined in the UE for a UL transmission indicated by the RAR. For example, the UE always sets the second HARQ process to be the HARQ process addressed by the HARQ process identifier 0. The network may use a soft buffer corresponding to a predetermined HARQ process identifier to receive the UL transmission and the UL retransmission (e.g., if requested by the dynamic scheduling UL grant).

The UE may transmit a repetition of the second UL transmission in a TTI. The UE may start the second UL HARQ RTT timer for the second HARQ process according to the TTI (i.e., the timing of the second UL transmission). For example, the UE starts the second UL HARQ RTT timer in the TTI. In one example, the repetition may be the last repetition.

As stated in the process 40, the UE starts the second drx-ULRetransmissionTimer for the second HARQ process, when the second UL HARQ RTT timer expires. Thus, the UE may monitor the control channel (e.g., PDCCH, EPDCCH, MPDCCH or NPDCCH), when the second drx-ULRetransmissionTimer is running in TTI(s) belonging to an off duration of a DRX cycle configured by the network. The UE performs a DRX operation according to the DRX cycle. When the network needs to transmit a control command to the UE in the off duration of the DRX cycle, the network can transmit a UL grant in one of the TTI(s) to the UE since the second drx-ULRetransmissionTimer is running. In other words, the network also takes into account whether the second drx-ULRetransmissionTimer is running (especially in the off duration of the DRX cycle of the UE), when the network needs (or intends) to transmit the control command. That is, the network may not transmit the control command in the off duration of the DRX cycle of the UE, when the second drx-ULRetransmissionTimer is not running. In one example, the UE transmits a retransmission of the second UL transmission, when the UE receives the control command indicating the retransmission. That is, the control command includes a dynamic scheduling UL grant. The control command may include the HARQ process number (e.g., 0) indicating the HARQ process identifier.

In one example, the network maintains a timer corresponding to the second drx-ULRetransmissionTimer running in the UE. The network determines that the second drx-ULRetransmissionTimer is running, when the timer is running. The network determines that the second drx-ULRetransmissionTimer is not running, when the timer is not running (e.g., expires). In another example, the network determines that the second drx-ULRetransmissionTimer is running, when a TTI is within a first length of the second drx-ULRetransmissionTimer which starts according to a second length of the second UL HARQ RTT timer. The second length may be configured by the network or may be predetermined by the UE.

In one example, the first repetition of the at least one second repetition is a new transmission, and rest of the at least one second repetition after the first repetition is retransmission(s). The UE transmits the new transmission in a TTI. The UE transmits the rest of the at least one second repetition in TTI(s) following the TTI. In one example, the at least one second repetition includes a second plurality of repetitions, if the UE is a NB-IoT UE, is a BL UE, or is in CE. The repetition number of the second plurality of repetitions may be indicated in the RAR. In one example, the at least one second repetition includes only one repetition (i.e., the UE transmits the second UL transmission only once), if the UE is none of a NB-IoT UE, a BL UE, and in CE. In this example, the RAR may not indicate the repetition number, or may indicate only one repetition.

In one example, the UE starts the second UL HARQ RTT timer in response to the second UL transmission by starting the second UL HARQ RTT timer in response to one of the second plurality of repetitions. For example, the one of the second plurality of repetitions may be the first repetition, the second repetition, . . . , or the last repetition of the second plurality of repetitions.

The network may transmit the control command on a control channel as described in the process 30, and is not narrated herein.

Figure 5:
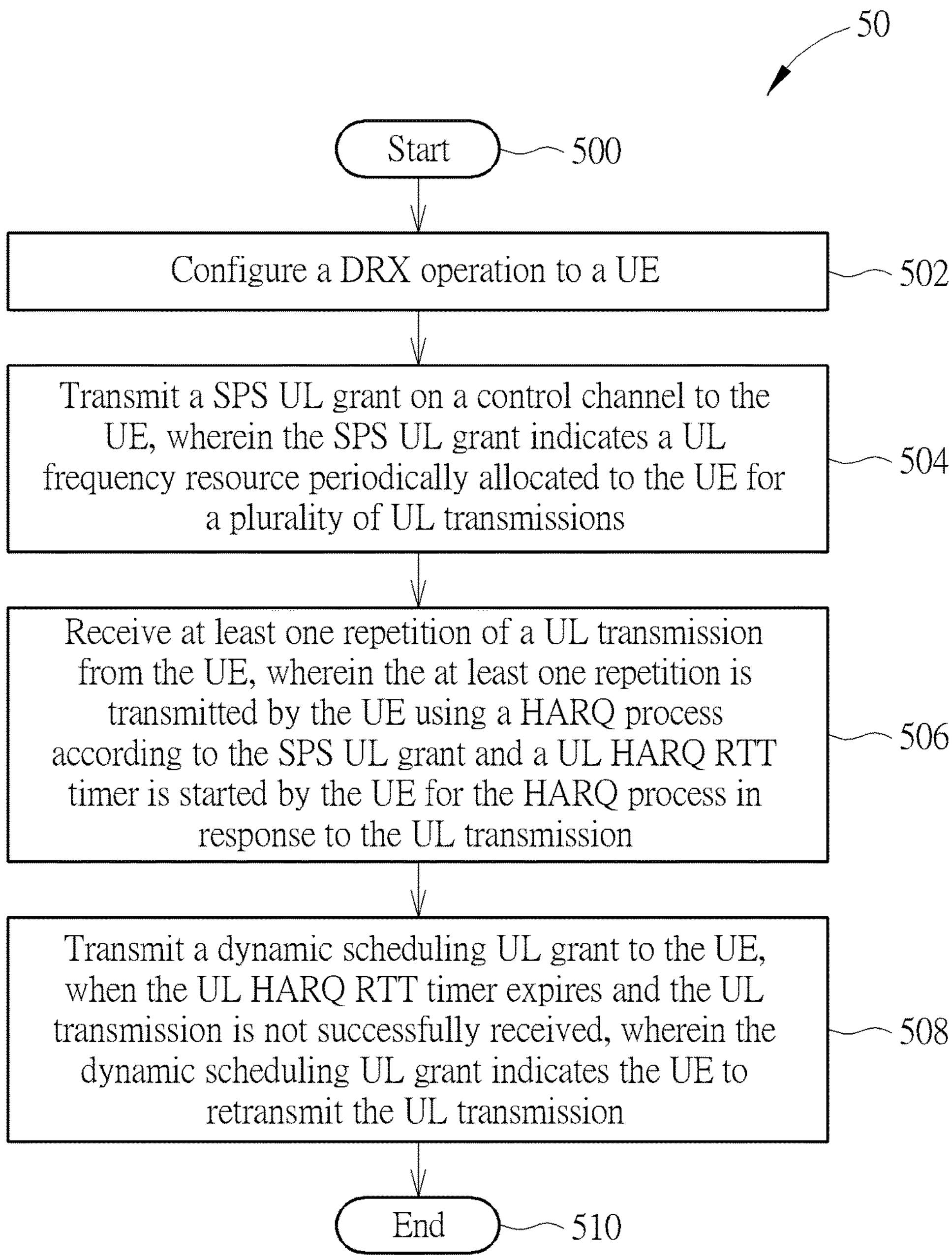
FIG. 5 is a flowchart of a process according to an example of the present invention.

FIG. 5 is a flowchart of a process 50 according to an example of the present invention. The process 50 is utilized in a BS in the network of FIG. 1, to handle a UL transmission (e.g., asynchronous transmission). The process 50 includes the following steps:

Step 500: Start.

Step 502: Configure a DRX operation to a UE.

Step 504: Transmit a SPS UL grant on a control channel to the UE, wherein the SPS UL grant indicates a UL frequency resource periodically allocated to the UE for a plurality of UL transmissions.

Step 506: Receive at least one repetition of a UL transmission from the UE, wherein the at least one repetition is transmitted by the UE using a HARQ process according to the SPS UL grant and a UL HARQ RTT timer is started by the UE for the HARQ process in response to the UL transmission.

Step 508: Transmit a dynamic scheduling UL grant to the UE, when the UL HARQ RTT timer expires and the UL transmission is not successfully received, wherein the dynamic scheduling UL grant indicates the UE to retransmit the UL transmission.

Step 510: End.

According to the process 50, the BS configures a DRX operation to the UE, e.g. by transmitting a first RRC message (e.g., RRCConnectionReconfiguration message) including a DRX configuration to the UE. The DRX configuration may configure a time value for the drx-ULRetransmissionTimer as described above. The BS transmits a SPS UL grant on a control channel to the UE, wherein the SPS UL grant indicates a UL frequency resource periodically allocated to the UE for a plurality of UL transmissions. The BS may transmit a SPS period (or called SPS scheduled interval, e.g., semiPersistSchedIntervalUL) in the first RRC message or in a second RRC message to the UE. The process 50 may be performed by the network for communicating with a UE performing the process 30. Examples for the process 30 may be applied to the process 50, and are not repeated herein.

In one example, the network maintains a timer corresponding to the UL HARQ timer running in the UE. The network determines that the UL HARQ timer expires, when the timer expires. In another example, the network determines that the UL HARQ timer expires, when a TTI is outside a length of the UL HARQ RTT timer starting from the first or the last repetition of the UL transmission.

Figure 6:
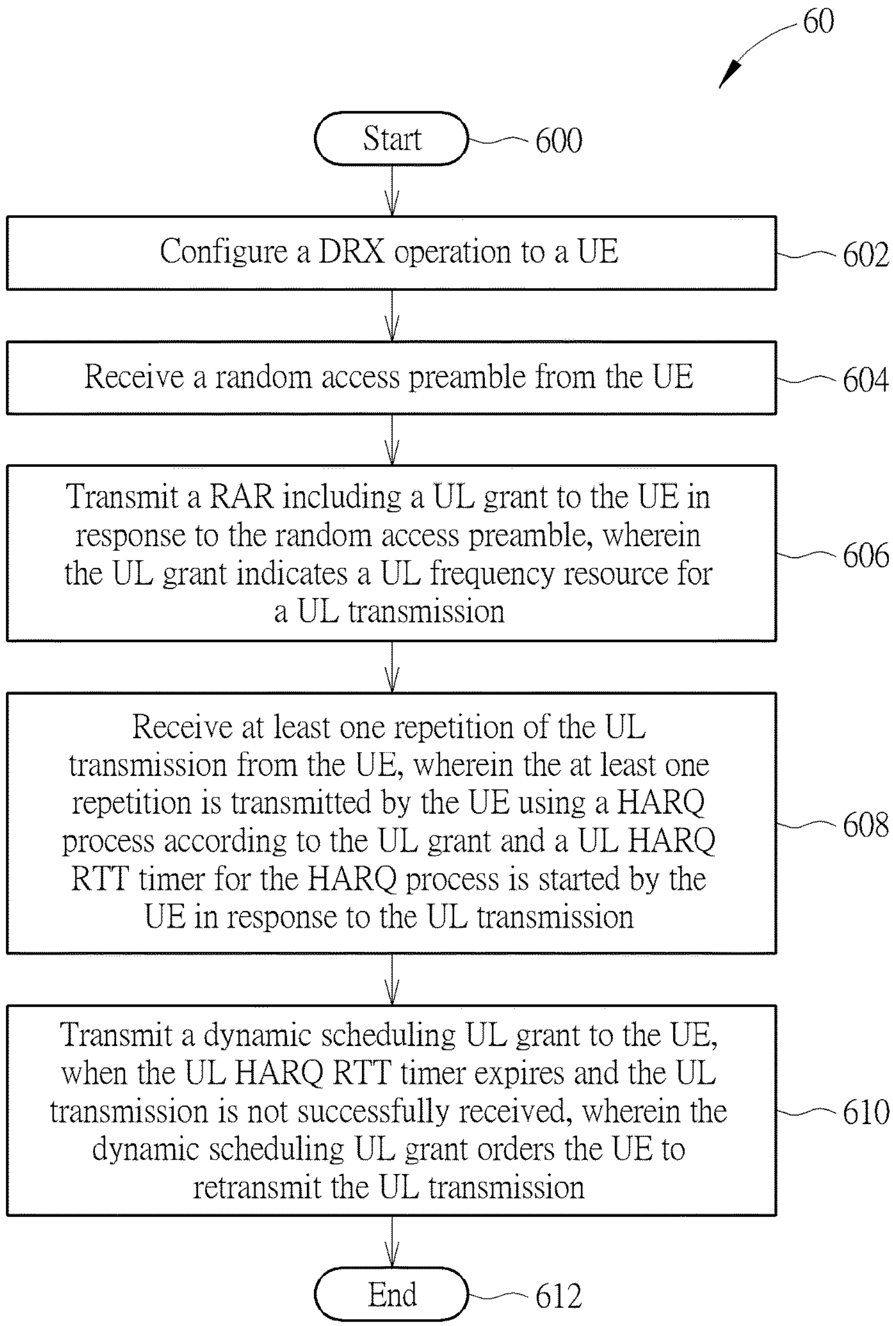
FIG. 6 is a flowchart of a process according to an example of the present invention.

FIG. 6 is a flowchart of a process 60 according to an example of the present invention. The process 60 is utilized in a BS in the network of FIG. 1, to handle a UL transmission (e.g., asynchronous transmission). The process 60 includes the following steps:

Step 600: Start.

Step 602: Configure a DRX operation to a UE.

Step 604: Receive a random access preamble from the UE.

Step 606: Transmit a RAR including a UL grant to the UE in response to the random access preamble, wherein the UL grant indicates a UL frequency resource for a UL transmission.

Step 608: Receive at least one repetition of the UL transmission from the UE, wherein the at least one repetition is transmitted by the UE using a HARQ process according to the UL grant and a UL HARQ RTT timer for the HARQ process is started by the UE in response to the UL transmission.

Step 610: Transmit a dynamic scheduling UL grant to the UE, when the UL HARQ RTT timer expires and the UL transmission is not successfully received, wherein the dynamic scheduling UL grant orders the UE to retransmit the UL transmission.

Step 612: End.

The process 60 may be performed by the network for communicating with a UE performing the process 40. Examples for the process 40 may be applied to the process 60, and are not repeated herein.

In summary, the processes above solve a problem that the UE misses the control command transmitted by the BS in a TTI in the off duration.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a device and a method for handling UL transmission. The UE can handle a HARQ process and UL transmissions(s) of the HARQ process properly according to corresponding timers, after a SPS UL grant or a dynamic scheduling UL grant is configured to the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling an uplink (UL) transmission, comprising:

a storage device, for storing instructions of:

receiving a semi-persistent scheduling (SPS) UL grant on a control channel in a first transmission time interval (TTI) from a base station (BS), wherein the SPS UL grant indicates a UL frequency resource periodically allocated to the communication device for a plurality of UL transmissions;

storing the SPS UL grant as a configured UL grant;

initializing the configured UL grant to start in an earliest TTI after the first TTI and applying the configured UL grant to a plurality of TTIs after the earliest TTI;

transmitting at least one first repetition of a UL transmission by using a hybrid automatic repeat request (HARQ) process according to the configured UL grant;

starting a UL HARQ round trip time (RTT) timer for the HARQ process in response to the UL transmission; and starting a drx-ULRetransmissionTimer for the HARQ process, when the UL HARQ RTT timer expires; and a processing circuit, coupled to the storage device, configured to execute the instructions stored in the storage device.

2. The communication device of claim 1, wherein the storage device further stores the instruction of:

monitoring the control channel, when the drx-ULRetransmissionTimer is running in at least one TTI belonging to an off duration of a DRX cycle.

3. The communication device of claim 1, wherein the communication device starts the UL HARQ RTT timer by starting the UL HARQ RTT timer in response to one of the at least one first repetition.

4. The communication device of claim 1, wherein the storage device further stores the instruction of:

receiving a dynamic scheduling UL grant on the control channel in a second TTI from the BS, wherein the dynamic scheduling UL grant indicates a UL retransmission of the UL transmission; and transmitting at least one second repetition of the UL retransmission by using the HARQ process according to the dynamic scheduling UL grant.

* * * * *